United States Patent [19]

Yamada et al.

[11] 4,308,830
[45] Jan. 5, 1982

[54] VANE IN THE INLET PASSAGE OF AN INTERNAL COMBUSTION ENGINE

[75] Inventors: Norimasa Yamada; Yoshihiro Iwashita; Masanori Okada; Yoshihiro Kanome, all of Toyota, Japan

[73] Assignee: Toyota Jidosha Kogyo Kabushiki Kaisha, Toyota, Japan

[21] Appl. No.: 45,666

[22] Filed: Jun. 5, 1979

[30] Foreign Application Priority Data

Sep. 18, 1978 [JP] Japan .................. 53-114220

[51] Int. Cl.³ ............................................. F02D 9/08
[52] U.S. Cl. ..................... 123/188 M; 123/308
[58] Field of Search ............... 123/188 M, 52 M, 141, 123/30 C, 306, 590, 592, 593, 308, 432

[56] References Cited

U.S. PATENT DOCUMENTS

| Re. 25,578 | 5/1964 | Witzky | 123/30 C |
|---|---|---|---|
| 2,920,613 | 1/1960 | Vogel et al. | 123/188 M |
| 3,008,458 | 11/1961 | Eisele et al. | 123/188 M |
| 3,874,357 | 4/1975 | List et al. | 123/188 M |

FOREIGN PATENT DOCUMENTS

| 1576012 | 10/1970 | Fed. Rep. of Germany | 123/188 M |
|---|---|---|---|
| 2803533 | 8/1979 | Fed. Rep. of Germany | 123/188 M |
| 52-64512 | 5/1977 | Japan | 123/188 M |

Primary Examiner—Craig R. Feinberg
Assistant Examiner—W. R. Wolfe
Attorney, Agent, or Firm—Kenyon & Kenyon

[57] ABSTRACT

In an internal combustion engine which is provided with a throttle valve of the type which, when slightly opened, provides a flow of intake gases which is biased towards one particular side of the intake passage, a vane is provided, which particularly directs gases passing near that one particular side of the intake passage towards a portion of the edge of the inlet port which is most remote from the central axis of the power cylinder, whereby good swirl and turbulence are generated in the power cylinder, especially during low and medium load operation of the engine.

3 Claims, 9 Drawing Figures

VANE IN THE INLET PASSAGE OF AN INTERNAL COMBUSTION ENGINE

BACKGROUND OF THE INVENTION

The present invention relates generally to intake structures for internal combustion engines, and more particularly, to a vane which is incorporated in the intake passage of internal combustion engines for producing advantageous swirl in the combustion chambers of the engine during operation.

In the field of internal combustion engines, it is known that, if the intake gas induced into a combustion chamber is provided with a swirling motion, the resulting turbulence assists the propagation of flame in the combustion chamber increasing the speed of flame propagation, thereby improving the performance of the engine. In additions the anti-knock and driving characteristics of the engine, and the quality of the exhaust emissions thereof, are improved.

Conventionally, the inlet port of an internal combustion engine, especially a gasoline engine, is formed so as to minimize the resistance to the flow of intake gases and thereby increase the volumetric efficiency and maximum output power of the engine at high load operation. When such an internal combustion engine is operating at high load, although the flow or suction resistance of the inlet port is low, sufficient turbulence and swirl is caused in the combustion chamber for the flame propagation speed to be kept at an acceptable level.

However, during low and medium load operation, in which the amount of inlet gases is relatively low, good swirl and turbulence of the inlet gases does not occur, due to the low flow resistance of the inlet port, and because the velocity of the inlet gas entering the combustion chamber from the inlet port is low. Thus combustion speed is sometimes not high enough, and, especially if the engine is operating in a lean mixture condition, or is provided with a substantial quantity of exhaust gas recirculation, good operating performance of the engine may be lost.

The present invention results from the realization that, if the flow of inlet gases through the inlet port is directed past the side of the inlet port which is remote from the central axis of the power cylinder, i.e. closest to the circumference of the power cylinder, especially during low and medium load operation of the engine, swirl and turbulence in the combustion chamber would be advantageously improved, and combustion speed would be increased.

It is, therefore, an object of the present invention to provide an apparatus in the inlet passage of an internal combustion engine by which the mixture gas is directed into the combustion chamber as a flow particularly directed past the part of the edge of the inlet port which is remote from the central axis of the power cylinder of the engine, particularly in low and medium load operation of the engine.

SUMMARY OF THE INVENTION

According to the present invention, this object is accomplished, in an internal combustion engine of the type having a cylinder; a cylinder head closing the top of the cylinder formed with an inlet port which is offset from the central axis of the cylinder; an inlet passage, defined by a wall, leading to the inlet port; and a throttle valve in the inlet passage, which can move from a first position wherein it substantially closes the inlet passage to a second position wherein it affords a large opening in the inlet passage, and which when it is moved a relatively small amount from the first position affords an opening in the inlet passage which is asymmetrically offset towards a particular portion of the wall of the inlet passage; by a vane, which is provided in the inlet passage downstream of the throttle valve, and which guides gas flowing along the inlet passage nearer the particular wall portion thereof towards the part of the edge of the inlet port which is more remote from the central axis of the cylinder.

BRIEF DESCRIPTION OF THE DRAWINGS

The present invention will become more fully understood from the following description of several preferred embodiments thereof, and from the appended drawings. It should be understood, however, that the description of the embodiments, and the drawings, are intended for the purposes of explanation only, and are not to be taken as limiting the present invention in any way. The scope of protection sought for the present invention, and the definition of its limits, is to be found solely in the appended Claims. In the drawings:

DESCRIPTION OF THE PREFERRED EMBODIMENTS

Figure 1:
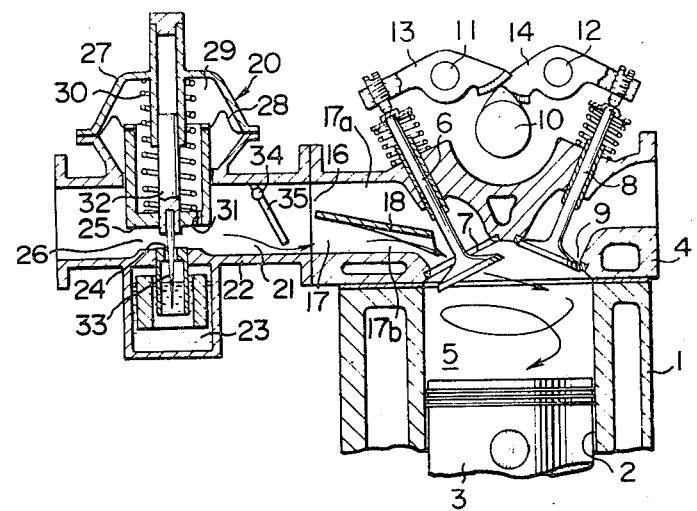
FIG. 1 is a longitudinal section showing an internal combustion engine equipped with a vane which is an embodiment of the present invention.
Figure 2:
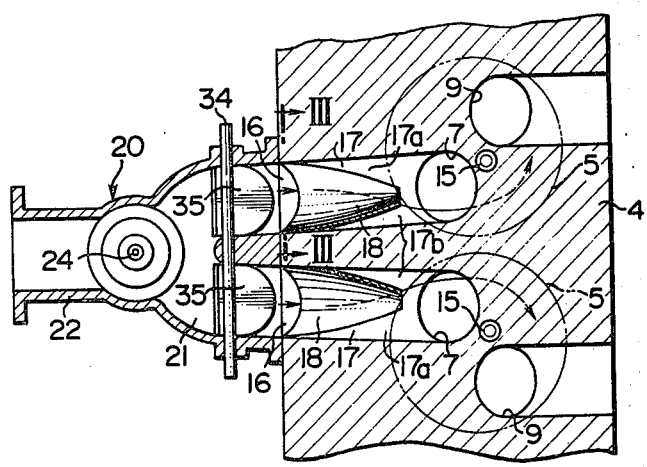
FIG. 2 is a transverse horizontal section of the inlet passage and the vanes of the engine shown in FIG. 1.
Figure 3:
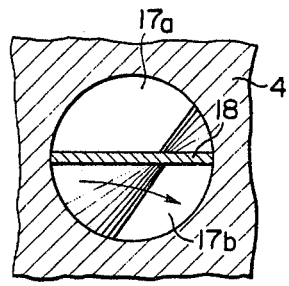
FIG. 3 is a cross-section of part of the vane and inlet passage shown in FIG. 2, taken along the line III—III in FIG. 2.

Referring first to FIG. 1, there is shown one cylinder of an internal combustion engine equipped with vanes according to the present invention, in longitudinal section. A transverse horizontal section of the inlet passage and the vanes is shown in FIG. 2, which shows two similar cylinders of the engine, and a cross-section taken along the line III—III in FIG. 2 is shown in FIG. 3. In these drawings, reference numeral 1 denotes the cylinder block of the engine, which has a cylinder bore 2 therein in which reciprocates a piston 3. A cylinder head 4 closes the top of the cylinder bore 2, defining a combustion chamber 5 above the piston 3. This cylinder head 4 has an inlet port 7, which is an opening in the surface of the combustion chamber 5 which is opened and closed by means of an inlet valve 6, and further has an exhaust port 9, which is another opening in the surface of the combustion chamber 5 which is opened and closed by means of an exhaust valve 8. These inlet and exhaust valves 7 and 8 are opened and closed by means of an overhead cam valve driving apparatus, which is known in the art, and which includes a camshaft 10, rocker arm shafts 11 and 12, rocker arms 13 and 14, etc. The cylinder head 4 is equipped with an ignition plug 15.

The inlet port 7, as best shown in FIG. 2, opens into the combustion chamber 5 at a position which is offset from the central axis (not shown) of the cylinder 2. An inlet passage leads to the inlet port 7, which is defined by a carburetor inlet passage 21 (to be described in more detail later), a cylinder head inlet opening 16, and a cylinder head inlet passage 17. In this cylinder head inlet passage 17 is provided a vane 18 according to the present invention.

This vane 18 extends substantially from the cylinder head inlet opening 16 to the proximity of the inlet port 7, and, in this embodiment, it reaches across the inlet passage 17 so as to divide it into two passages 17a and 17b, which extend beside one another, separated by the vane 18. The left-hand end of this vane 18 extends substantially horizontally across the cylinder head inlet opening 16, so as to divide it approximately in half, with an upper and a lower part. Along its length, this vane 18 gradually twists, so that at its right-hand end in the figure, which is nearest the inlet port 7, the end of passage 17b, which is the passage which opens to the lower part of the cylinder head inlet opening 16 at its left hand end, is closest to that circumferential part of the inlet port 7 which is furthest from the central axis of the cylinder 2. Further, the shape of the vane 18 is such that the cross-sectional area of the passage 17b narrows down in the direction away from the cylinder head inlet opening 16 towards the inlet port 7.

It is preferable that the vane 18 should have a length of about 1.5–2.5 times the diameter of the passage 17. It should be noticed that, in this embodiment, the leading edge of the vane 18, which crosses the cylinder head inlet opening 16, is cut away, i.e. concaved. This provides a good slicing action of the impinging gas flow, and reduces turbulence in the inlet passage.

To the cylinder head inlet opening 16, fuel/air mixture produced by a carburetor 20 is delivered. In this embodiment, the carburetor 20 is a variable venturi type carburetor known as a SU-type carburetor. However, this is not essential.

The carburetor 20 has a body 22, which includes an inlet passage 21 extending transversely through it. The body 22 is coupled with the side of the cylinder head 4, so that one end of the inlet passage 21 is connected to the cylinder head inlet opening 16. In the shown embodiment, the carburetor 20 is adapted to deliver fuel-/air mixture to two cylinders of the engine, and therefore the inlet passage 21 is formed into two branches at its end which is nearer to the cylinder head 4, each of these branches being connected to a cylinder head inlet opening 16 associated with one of these two cylinders.

The body 22 has a float chamber 23 in which a supply of fuel is maintained at a constant level by means well known in the carburetor art. This fuel is sucked into the inlet passage 21 through a metering orifice 24 in the bottom wall of the inlet passage 21. The body 22 further carries a suction piston 25 in a position opposed to the metering orifice 24, this suction piston 25 being movable upwards and downwards as seen in the drawing. The bottom end of this suction piston 25 defines a variable venturi opening 26, in co-operation with the bottom wall and the side walls of the inlet passage 21. The suction piston 25 further defines a negative pressure chamber 29 in co-operation with a cover 27 and a diaphragm 28, and is movable upwards in the drawing by the vacuum depression in the chamber 29, against the action of a compression coil spring 30. This negative pressure chamber 29 communicates to the variable venturi opening 26, via a suction hole 31, and therefore is provided with venturi vacuum. Furthermore, this suction piston 25 carries a metering needle 33 by way of a guide rod 32. This metering needle 33 engages into the metering orifice 24, and therefore varies the effective opening area thereof, thus metering the flow of fuel therethrough.

In this arrangement, as is well known, as the negative pressure or depression at the variable venturi opening 26 increases, the suction piston 25 is moved upwards in the drawing against the biasing action of the compression coil spring 30 and widens the effective opening of the variable venturi opening 26, thereby decreasing the said negative pressure there. Conversely, as the negative pressure at the venturi opening 26 decreases, the suction piston 25 is moved downwards in the figure by the biasing action of the compression coil spring 30, and its own weight, thereby increasing the said negative pressure at the variable venturi opening 26, by decreasing the effective opening thereof. Thus, the negative pressure at the variable venturi opening 26 is maintained at an approximately constant value during engine operation, and the effective cross-sectional area of this variable venturi opening 26 is made to be proportional to the inlet air quantity at each particular time. In connection with this, the profile of the metering needle 33 is so designed that, in response to the opening and closing of the venturi opening 26, it opens and closes the metering orifice 24 to the correct degree so that the air/fuel ratio of the inlet gases which are provided to the engine are maintained approximately constant, irrespective of the actual quantity of inlet gases.

The actual quantity of inlet gases inhaled by the engine is controlled by a flapper-type inlet throttling valve 35, which is located in the inlet passage 21 downstream from the venturi opening 26. As shown in FIG. 2, one such throttle valve is provided for each cylinder of the engine, and these valves are controlled by a common valve shaft 34, which is operated by the accelerator pedal of the vehicle. It is essential to the operation of the vanes 18 according to the present invention that these throttle valves 35 are of the type which, when slightly opened, provide a gas flow which is biased towards one side of the inlet passage, which is the lower side in FIG. 1. That is, in this embodiment, the opening in the inlet passage, when the throttle valve 35 is moved a relatively small amount from the idling position, is asymmetrically offset towards the lower side of the inlet passage, as seen in FIG. 1. According to the principle of the present invention, this lower side of the inlet passage is the part which opposes the passage 17b formed on the one side of the vane 18 which leads to the part of the circumference of the inlet port 7 which is furthest from the central axis of the cylinder 2.

The intake system described above operates as follows:

In low and medium load operation of the engine, when the opening of the throttle valve 35 is relatively small, the gas flow past this throttle valve 35 towards the cylinder head inlet opening 16 is through a relatively small gap between the lower edge of the throttle valve 35 and the lower wall of the inlet passage 21. Thus, this gas flow is rather close to this lower wall, and therefore all or almost all of it is directed into the passage 17b, rather than into the passage 17a. As this gas flows through the passage 17b, it is not dispersed and its speed is kept high because of the narrowness of this passage, and further because the passage narrows down towards the inlet port 7 the speed of this gas is actually increased towards the inlet port 7. Just before this gas enters the combustion chamber 5, it emerges from the part of the inlet port 7 which is furthest from the central axis of the cylinder 2, which is where the passage 17b debouches. A strong swirl flow is set up in the combustion chamber 5 around its central axis, as shown in FIG. 2. This promotes good engine operation.

In high load operation of the engine, on the other hand, the throttle valve 35 is wide open, and the flow of intake gases is not substantially biased towards any particular part of the intake passage 21 thereby. Therefore, these gases flow to the inlet port 7 through both the passages 17a and 17b, and the provision of the vane 18 does not provide any substantial obstacle to free breathing of the engine. However, the above-described swirling effect which occurs markedly during low and medium load operation of the engine also takes place, although to a less noticeable extent, during high load operation of the engine, and this again promotes good engine operation.

Figure 6:
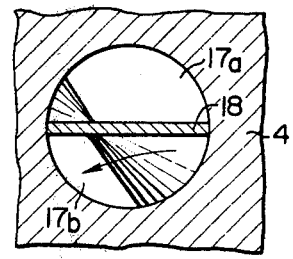
FIG. 6 is a cross-section taken along the line VI—VI in FIG. 5.
Figure 4:
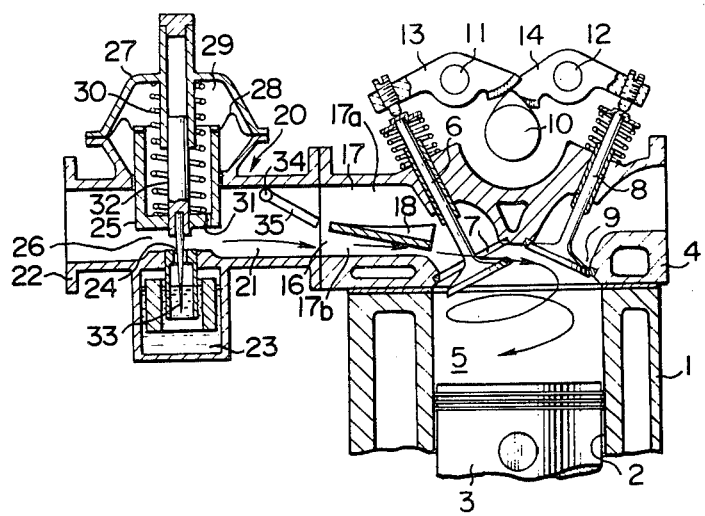
FIG. 4 is a longitudinal section showing another internal combustion engine equipped with eccentric ports and a vane which is an embodiment of the present invention.
Figure 5:
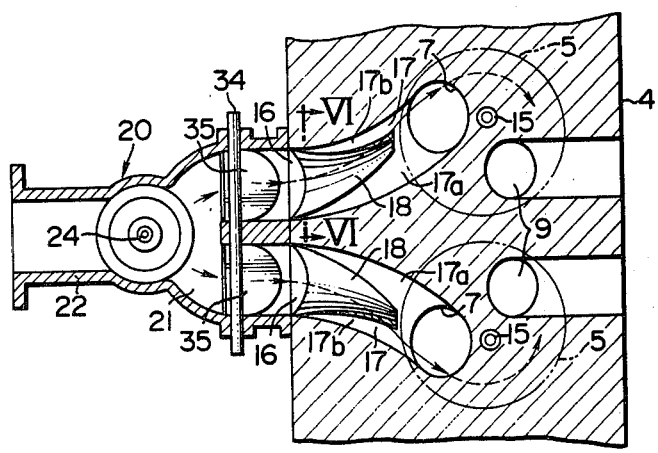
FIG. 5 is a transverse horizontal section of the inlet passage and the vanes of the engine shown in FIG. 4.

FIG. 4 is a longitudinal section, similar to FIG. 1,

FIG. 4 is a longitudinal section, similar to FIG. 1, through another engine equipped with vanes according to the present invention, the engine being equipped with eccentric inlet ports. FIG. 5 is a transverse horizontal section, similar to FIG. 2, of the inlet passage and the vanes of this engine, and FIG. 6 is a cross-section taken along the line VI—VI in FIG. 5. In these figures, the parts which correspond to those shown in FIGS. 1, 2, and 3 bear the same reference numerals.

In this engine, the inlet ports 7 are biased away from one another in pairs, as best shown in FIG. 5, and the inlet passages 17 and vanes 18 are curved. However, the vanes 18 in this engine operate in substantially the same way as those in the engine of FIGS. 1, 2, and 3. That is, each vane 18 divides its cylinder head inlet passage 17 into two passages 17a and 17b, and the passage 17b, which debouches at its end proximate to the inlet port 7 at the circumferential part of the inlet port 7 which is most remote from the central axis of the cylinder 2, is closest to the side of the inlet passage 21 to which the flow of inlet gases past the throttle valve 35 is biased, when the throttle valve 35 is opened a small amount beyond the idling position. Thereby the same advantageous effects are attained as in the previous engine.

It has been found to be preferable that the vane 18 should have a length of about 1.5-2.5 times the diameter of the cylinder head inlet passage 17, and that the transverse cross-sectional area of the passage 17b, which particularly receives the fuel/air mixture generated by the carburetor, when the throttle is only slightly opened, should be about 30%-50% of the total cross-sectional area of the cylinder head inlet passage 17, at the end of the vane 18 nearest to the cylinder head inlet opening 16, and should be about 15%-40% of the total cross-sectional area of the cylinder head inlet passage 17, at the end of the vane 18 nearest to the inlet port 7. It should be noticed that, also in this embodiment, the leading edge of the vane 18, which crosses the cylinder head inlet opening 16, is cut away, i.e. concaved.

Figure 9:
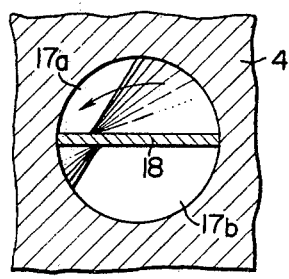
FIG. 9 is a cross-section taken along the line IX—IX in FIG. 8.
Figure 7:
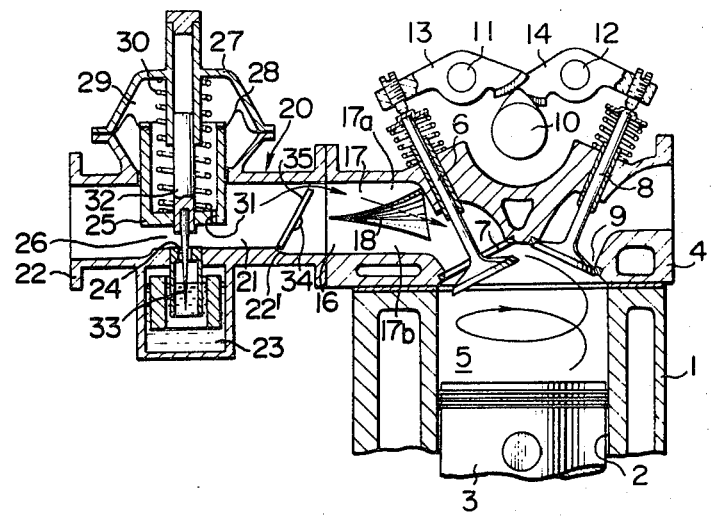
FIG. 7 is a longitudinal section showing another internal combustion engine fitted with vanes according to the present invention, which differs from the engine of FIGS. 4, 5, and 6, in that it has a different kind of throttle valve.
Figure 8:
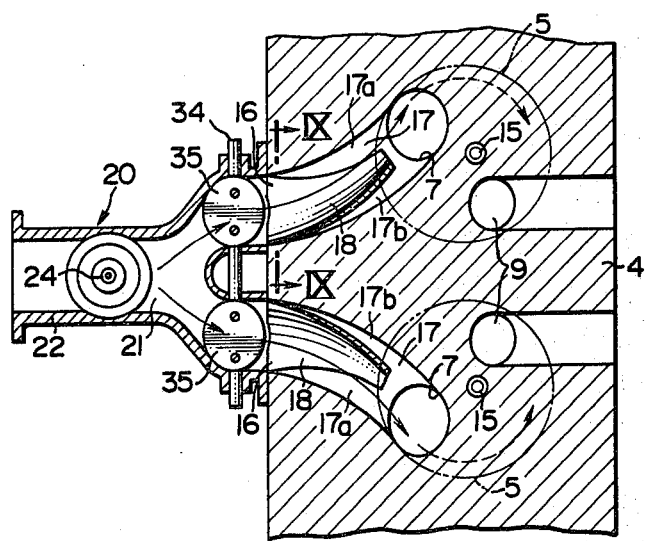
FIG. 8 is a transverse horizontal section of the vanes and inlet passage of the engine of FIG. 7.

FIGS. 7, 8, and 9 are figures similar to FIGS. 1 and 4, FIGS. 2 and 5, and FIGS. 3 and 6, respectively, showing a third engine fitted with vanes according to the present invention. This engine has eccentric inlet ports, like the engine of FIGS. 4, 5, and 6, but it differs from that engine in that the throttle valve 35 is constructed as a butterfly valve, which is adapted to open the inlet passage 21 only at its upper circumferential part, at throttle openings less than a predetermined opening, by the correspondence of the lower circumference of the butterfly element and a spherical wall portion 22' formed on the lower wall of the inlet passage 21. Corresponding to this change, it is the passage 17a, which opens to the upper part of the cylinder head inlet opening 16, and which therefore opposes the part of the throttle valve 35 which particularly allows passage of fuel/air mixture at small throttle openings, which debouches, at its end proximate to the inlet port 7, at the part of the circumference of the inlet port 7 which is most remote from the central axis of the cylinder 2. Thus it will easily be seen that the same functions and advantages are obtained by the vanes of the present invention, in this engine, as in the other two engines described.

It should be noticed that in this embodiment the leading edge of the vane 18, which crosses the cylinder head inlet opening 16, is not cut away, but substantially straight.

From the foregoing descriptions it will be clearly seen that the vane of the present invention functions to generate a swirl in the combustion chamber, and particularly to generate good swirl during low and medium throttle opening operation of the engine. Thus, good combustion speed can be obtained over the entire range of operational conditions of the engine, and engine output power, anti-knock characteristic, drivability, and quality of engine exhaust emissions can be improved.

It should be understood that, although the shown embodiments have contained vanes which completely divided the inlet passage into two separate inlet passages, this is not essential for the present invention; it would suffice for the vane merely to selectively direct some of the incoming fuel/air mixture, at small throttle openings, to the part of the circumference of the inlet port which is most remote from the central axis of the cylinder. In embodiments wherein the vane of the present invention divides the inlet passage into two separate inlet passages, it is not essential for the passage which preferentially receives fuel/air mixture at small throttle openings to narrow down in the direction towards the inlet port, although it is beneficial. Therefore, it should be understood that, since various changes, modifications, and omissions can be made in the details of any particular embodiment of the present invention, without departing from its scope, the present invention is not to be limited by any particular details of the embodiments which have been shown, or of the drawings, but solely by the appended claims.

We claim:

1. In an internal combustion engine of the type having a cylinder having a central axis; a cylinder head closing the top of the cylinder, the cylinder head being formed with an inlet port which is offset from the central axis of the cylinder; an inlet passage, defined by a wall, leading to the inlet port; and a throttle valve in the inlet passage, the throttle valve being movable between a first position wherein it substantially closes the inlet passage, to a second position wherein it affords a large opening in the inlet passage, and which when it is moved a relatively small amount from the first position affords a small first opening in the inlet passage which is asymmetrically offset towards a particular portion of the wall of the inlet passage; the internal combustion engine being CHARACTERIZED IN THAT there is further provided: a vane in the inlet passage downstream of the throttle valve, said vane having a concaved leading edge located in proximity to the throttle valve, said leading edge spanning across the inlet passage so as to define a first flow passage having a first flow passage inlet which is aligned with the small first opening defined between the throttle valve and the particular wall portion of the inlet passage, and a second flow passage which is further from the particular wall portion of the inlet passage than said first flow passage, said vane having a trailing edge which defines the end of the first flow passage to be near a portion of the edge of the inlet port which is remote from the central axis of the cylinder.

2. The internal combustion engine as in claim 1, wherein said first flow passage narrows down in cross-sectional area in a direction leading away from the throttle valve.

3. The internal combustion engine as in claim 1, wherein said vane is twisted from said leading edge towards said trailing edge so as to adapt said leading edge to be in alignment with the small first opening in the inlet passage, and to adapt the trailing edge to be near said portion of the inlet port which is remote from the central axis of the cylinder.

* * * * *